(12) United States Patent
Kerr et al.

(10) Patent No.: US 9,205,600 B1
(45) Date of Patent: Dec. 8, 2015

(54) MOVEABLE PLATFORM WITH 2-AXIS RACK AND PINION DRIVE

(71) Applicants: Jeffrey Kerr, Bellingham, WA (US); Steven Schell, Arcadia, CA (US)

(72) Inventors: Jeffrey Kerr, Bellingham, WA (US); Steven Schell, Arcadia, CA (US)

(73) Assignee: NEW MATTER, INC., Pasadena, CA (US)

( * ) Notice: Subject to any disclaimer, the term of this patent is extended or adjusted under 35 U.S.C. 154(b) by 0 days.

(21) Appl. No.: 14/508,808

(22) Filed: Oct. 7, 2014

Related U.S. Application Data

(60) Provisional application No. 61/947,634, filed on Mar. 4, 2014.

(51) Int. Cl.
*A47B 11/00* (2006.01)
*B29C 67/00* (2006.01)
*B23Q 3/18* (2006.01)

(52) U.S. Cl.
CPC .............. *B29C 67/0092* (2013.01); *B23Q 3/18* (2013.01)

(58) Field of Classification Search
CPC ........ B23Q 1/621; B23Q 1/28; B23Q 1/5437; A47B 13/081; B29C 67/0092

USPC .......................................................... 108/143
See application file for complete search history.

(56) References Cited

U.S. PATENT DOCUMENTS

| | | | | |
|---|---|---|---|---|
| 5,311,791 | A * | 5/1994 | Yanagisawa | 74/490.09 |
| 6,327,929 | B1 * | 12/2001 | Yanagisawa | 74/490.09 |
| 7,930,952 | B2 * | 4/2011 | Wang et al. | 74/490.09 |
| 8,087,320 | B2 * | 1/2012 | Hsieh et al. | 74/490.09 |
| 8,104,752 | B2 * | 1/2012 | Eidelberg | 269/60 |
| 2002/0140296 | A1 * | 10/2002 | Ebihara | 310/12 |
| 2004/0025761 | A1 * | 2/2004 | Sartorio | 108/143 |
| 2008/0308982 | A1 * | 12/2008 | Weston | 269/58 |
| 2009/0014932 | A1 * | 1/2009 | Nikaido et al. | 269/55 |
| 2009/0255447 | A1 * | 10/2009 | Schubert et al. | 108/143 |

* cited by examiner

*Primary Examiner* — Hanh V Tran
(74) *Attorney, Agent, or Firm* — Andrew S. Naglestad

(57) ABSTRACT

A positioning mechanism for precisely moving a 3D printing stage in two dimensions is disclosed. The positioning mechanism consists of a first drive assembly, a second drive assembly, a moveable platform, and a stationary frame. The first and second drive assemblies each consist of a gear rack, pinion wire, and actuator. The first and second drive assemblies are configured to move the stage in orthogonal directions in a substantially horizontal plane. Both the first and second pinion wires are in direct contact with the stage as well as the frame, thereby providing an effective parallel linkage between stage and frame.

24 Claims, 10 Drawing Sheets

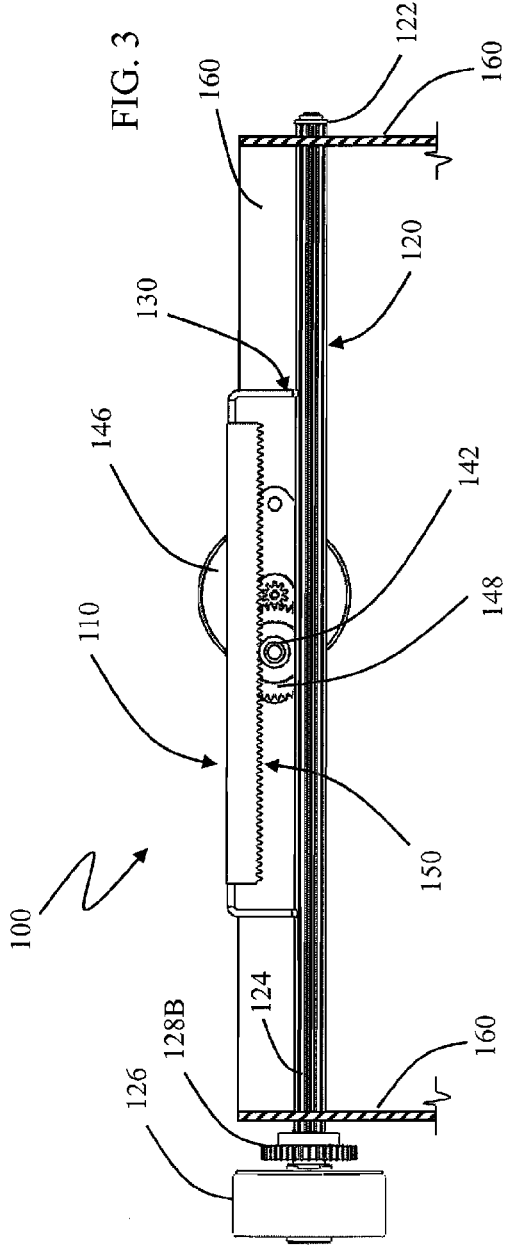
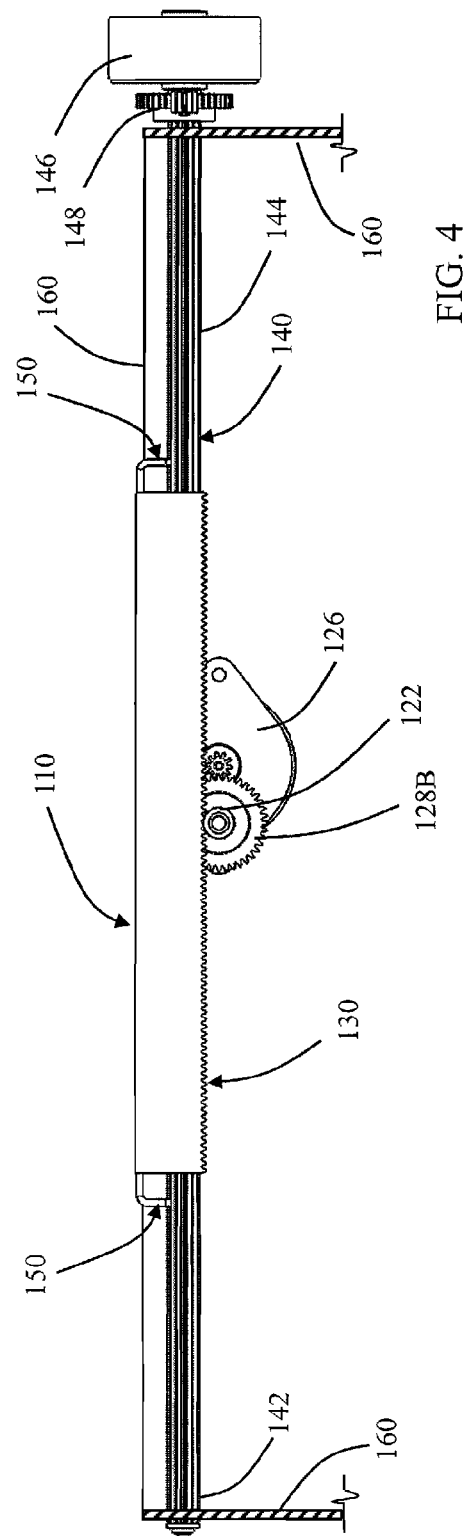

MOVEABLE PLATFORM WITH 2-AXIS RACK AND PINION DRIVE

CROSS-REFERENCE TO RELATED APPLICATION(S)

This application claims the benefit of U.S. Provisional Patent Application Ser. No. 61/947,634 filed Mar. 4, 2014, titled "MOVEABLE PLATFORM WITH 2-AXIS RACK AND PINION DRIVE," which is hereby incorporated by reference herein for all purposes.

TECHNICAL FIELD

The invention relates to a drive system for moving a platform in two dimensions. In particular, the invention relates to a linear drive system that employs pinion wires and gear racks to drive as well as support a moving platform and object thereon.

BACKGROUND

Three-dimensional (3D) printing technology is one of a number of applications in which a platform or similar type of table, support, frame, or jig must be positioned in two dimensions with a high degree of accuracy. In some 3D printing embodiments, the platform shifts in a horizontal plane while thermoplastic is selectively extruded at precise locations to build up the object under construction. Translation of the platform in the x- and y-directions is typically achieved with a combination of shafts, bearings, gears, pulleys, and belts which add to the complexity of the printer. For example, the two-dimensional (2D) actuation in some systems employ a first actuator assembly to directly drive the platform in a first direction and a second actuator assembly to indirectly drive the platform in a second direction via the first actuator assembly. That is, the second actuator assembly drives the combination of platform plus first actuator assembly in the second direction. In this type of system, the two actuators operate as a serial linkage to move the platform in the desired direction. The complexity of the serial linkage however increases the part count and thus the cost of the 3D printer. There is therefore a need for an accurate and inexpensive actuator system able to drive the platform with fewer less expensive parts.

SUMMARY

The present invention features a positioning mechanism for precisely moving a platform in two dimensions. The positioning mechanism may be used for a 3D printer or any of a number of other applications. In the preferred embodiment, the positioning mechanism consists of a first drive assembly, a second drive assembly, a moveable platform, and a stationary frame. The first drive assembly consists of a first gear rack, a first pinion wire, and a first actuator while the second drive assembly consists of a second gear rack, a second pinion wire, and a second actuator. The first and second drive assemblies are configured to move the platform in orthogonal directions in a substantially horizontal plane. Both the first and second pinion wires are in direct contact with the platform as well as the frame, thereby providing an effective parallel linkage between platform and frame.

The gear racks and pinion wires may be arranged in at least three different configurations. In the first, the gear racks are connected to the platform and ride on top of the pinion wires for both the x- and y-directions, the pinion wires being mounted to the frame. In the second embodiment, the gear racks are connected to the platform with one pinion wire riding over one gear rack and the other pinion wire riding under the other gear rack. In the third embodiment, the gear racks are connected to the platform with each pinion wire riding over one of the two gear racks. In other embodiments, the first and second drive assemblies as well as the pinion wires are mounted to the moveable platform, which enable the platform to rotate and slide across gear racks mounted to the stationary frame.

Each gear rack generally consists of two segments, each segment comprising a plurality of teeth arrayed linearly. The teeth may point upward or downward depending on the embodiment described above. A pinion wire generally consists of a rod with a plurality of teeth to engage the teeth of the gear rack. The teeth of the pinion wire are distributed around the circumference of the rod and extend the length of the pinion wire. In the preferred embodiment, the first and second pinion wires each comprise twelve teeth extending linearly along the length of the respective pinion wire. The pinion wires, which are arranged substantially perpendicularly, enable each pinion wire to drive the platform in a particular direction while sliding across the orthogonal pinion wire.

In the preferred embodiment, the first and second actuators each comprise a direct current (DC) servo motor or stepper motor with "speed-reducer" gears, step-down gears, or other power transmission. In other embodiments, the actuators may comprise electric, pneumatic, or hydraulic actuators, for example, with or without a power transmission.

The positioning mechanism in the preferred embodiment further includes a controller or a processor configured to independently control the first actuator and second actuator. As such, the platform may be made to move in any direction in the horizontal plane.

BRIEF DESCRIPTION OF THE DRAWINGS

The present invention is illustrated by way of example and not limitation in the figures of the accompanying drawings, and in which:

FIG. 3 is a front side view of the platform and drive assemblies of the 2D positioning mechanism, in accordance with one embodiment of the present invention;

FIG. 4 is a left side view of the platform and drive assemblies of the 2D positioning mechanism, in accordance with one embodiment of the present invention;

DETAILED DESCRIPTION OF THE PREFERRED EMBODIMENT

The present invention pertains to a positioning mechanism with a moveable platform with rack and pinion drives (RPDs) operating in parallel. The RPD positioning mechanism is configured to move in two directions independently in response to a computer, processor, or other type of controller. The positioning mechanism may be utilized in numerous applications including 3D printing processes where the platform may serve as a build platform on which a 3D object is constructed layer by layer. Each layer is produced by shifting the platform in the horizontal plane while simultaneously extruding thermoplastic material at a precise location onto the object being constructed. The positioning mechanism 100 is translated along the x-axis, y-axis, or both to precisely position the object under the nozzle (not shown) extruding the thermoplastic material.

Figure 1:
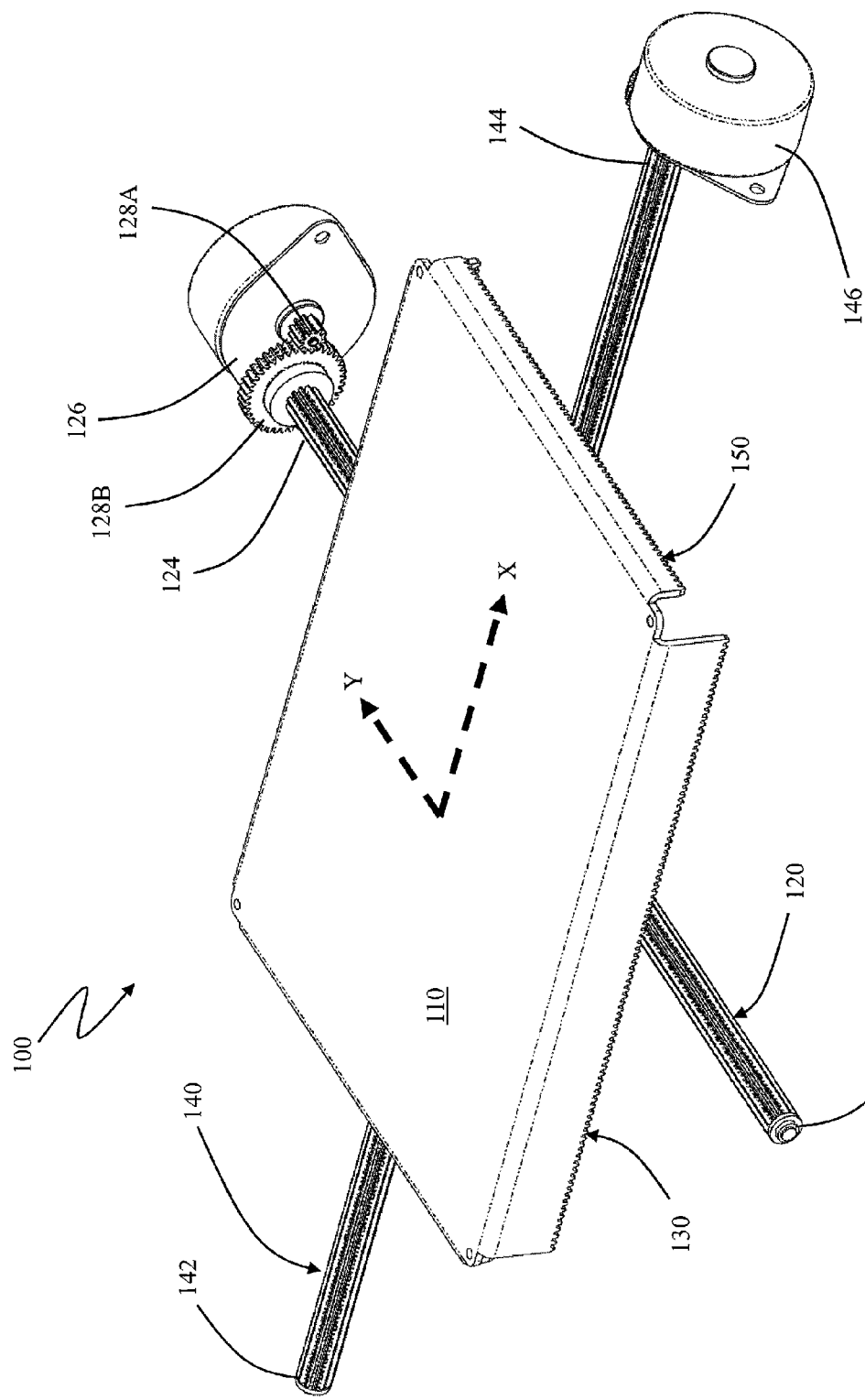
FIG. 1 is a top side perspective view of the platform and drive assemblies of the 2D positioning mechanism with rack and pinion drive, in accordance with one embodiment of the present invention.
Figure 2:
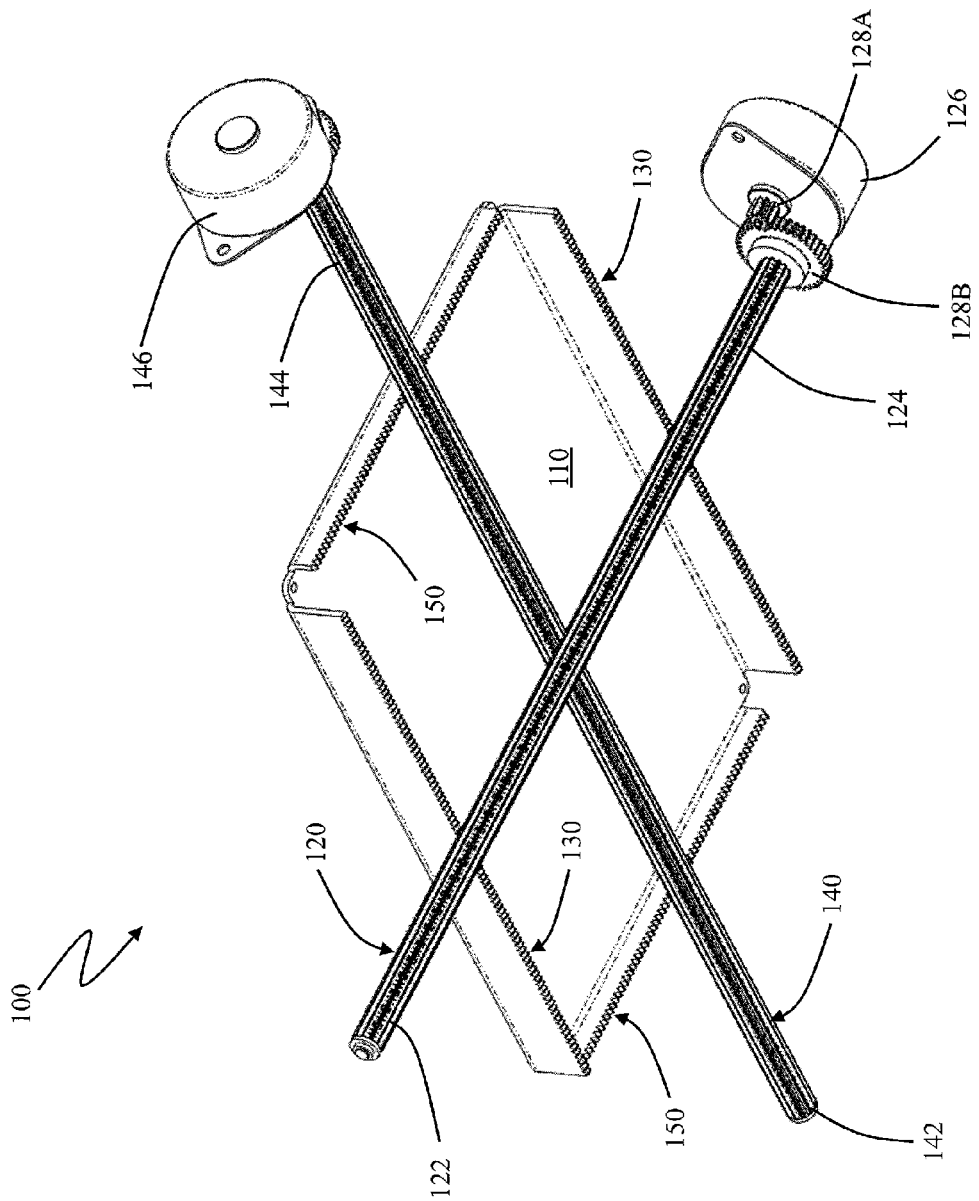
FIG. 2 is a bottom side perspective view of the platform and drive assemblies of the 2D positioning mechanism, in accordance with one embodiment of the present invention.

As illustrated in FIGS. 1 and 2, the RPD positioning mechanism 100 in the preferred embodiment comprises a platform such as a horizontal surface or stage 110 on which an object is actually built or printed. The stage includes a plurality of gear teeth on the underside of the stage, namely gear racks 130, 150. The gear racks, in turn, engage a plurality of pinion wires 120, 140 which carry the weight of the stage as well as move the stage laterally. The first gear rack 130 and pinion wire 120 serve as a first rack and pinion, respectively, while the second gear rack 150 and pinion wire 140 serve as a second rack and pinion, respectively, which operates orthogonal to the first gear rack and pinion wire. The pinion wires may, but need not necessarily, be orthogonal to one another.

The first pinion wire 120 includes a distal end 122 and a proximal end 124 coupled to a motor 126 via speed-reducer gears 128A, 128B. Similarly, the second pinion wire 140 includes a distal end 142 and a proximal end 144 coupled to a motor 146 via speed-reducer gears 148. In addition to motors, various other electric, hydraulic, and pneumatic actuators may be employed to drive the stage in the manner described herein. Referring to side views shown in FIGS. 3 and 4, the first pinion wire 120 resides below the second pinion wire 140 so as not to make contact. In this embodiment, the pinion wires and motors are mounted to a frame 160 (shown in some views) via a bearing which enables them to rotate in place without otherwise moving.

Figure 5:
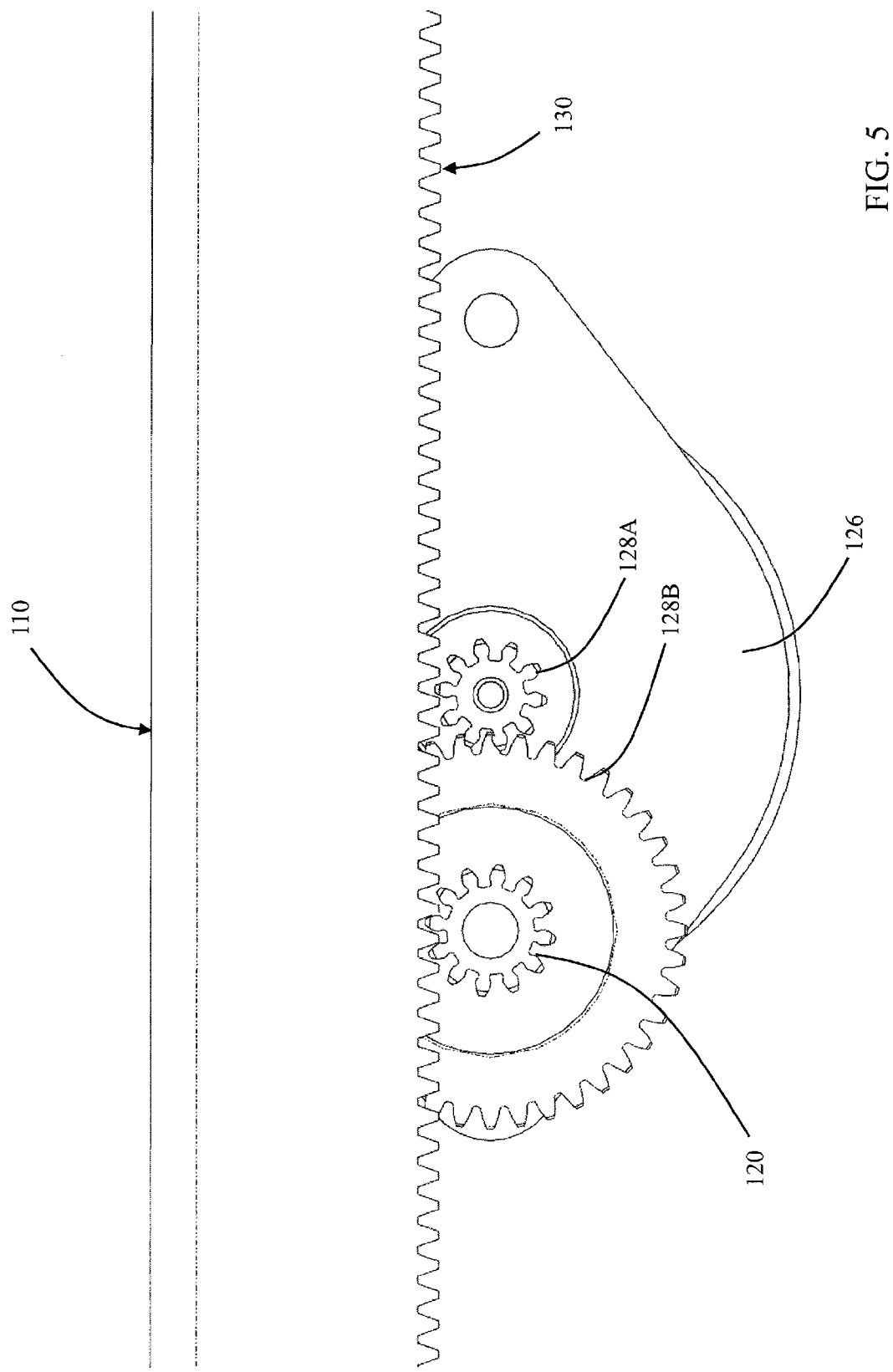
FIG. 5 is a left side view of the platform and one drive of the 2D positioning mechanism, in accordance with one embodiment of the present invention.

The first drive assembly including a first rack and pinion is shown in detail in FIG. 5. The gear rack 130 includes a plurality of teeth configured to engage the teeth of the pinion wire 120 shown looking down its longitudinal axis. The pinion wire 120 (and pinion wire 140) includes an elongated rod with teeth that form a pinion gear in cross section. This cross section is substantially uniform along the entire length of the rod. That is, each of the plurality of teeth on the rod extends the entire length of the rod. A gear rack can, therefore, be driven in the direction perpendicular to the pinion wire, yet easily slide parallel to the pinion along its length without disengaging the teeth. As such, the teeth of the gear rack 130 are configured to engage the pinion wire 120 at all times independent of the movement of the stage in two dimensions via the rolling contact and/or sliding contact. The pinion wire 120 is coupled to the motor 126 via a "speed-reducer" gearbox comprising a smaller gear 128A fixed to the motor 126 and a larger gear 128B fixed to the pinion wire 120. Instead of the speed-reducer, various step-down gearboxes and other power transmissions may be employed, or the motor may drive the pinion wire directly without speed reduction. In the present embodiment, each pinion wire consists of twelve teeth extending the length of the wire. The transmission is generally geared such that the stage is drive at a speed between 20 and 300 millimeters/sec with the preferred speed being about 100 mm/s.

Figure 6:
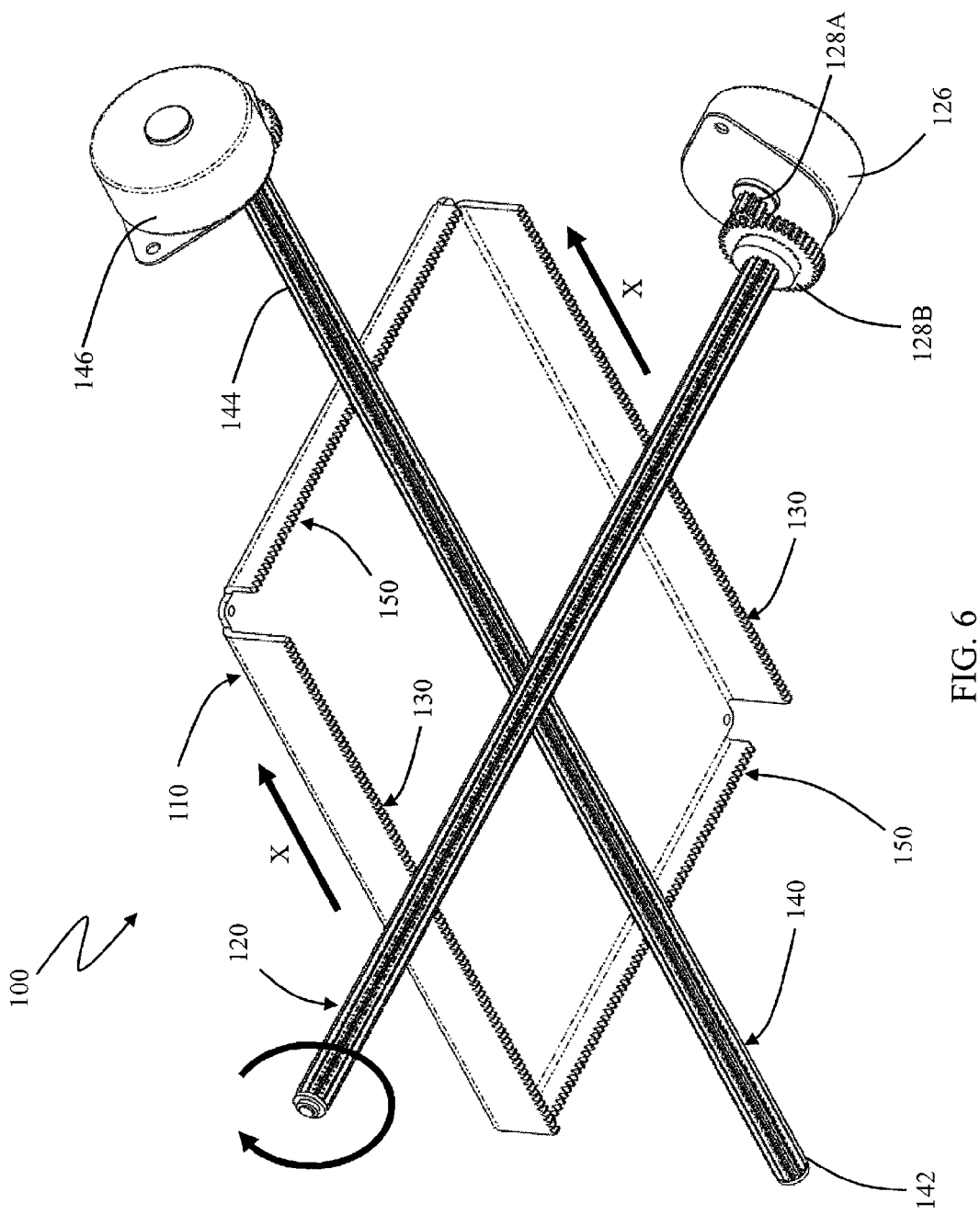
FIG. 6 is a bottom side perspective view of platform and drive assemblies of the 2D positioning mechanism, in accordance with one embodiment of the present invention.

The stage 110 is configured to translate in a horizontal plane relative to the pinion wires in response to a computer controller (not shown) that energizes actuators, i.e., stepper motors 126, 146. Referring to FIG. 6, the stage 110 is made to move in the x-direction when the first pinion wire 120 rotates clockwise and drives the linear gear racks 130 on either side of the stage to the right. Concurrently, the gear rack 150 slides longitudinally across the second pinion wire 140. Because the cross section of the pinion wire 150 is uniform along its length, the gear racks 150 can slide along the length of the pinion wire 140 without impediment. At the same time, the pinion gear 140 serves as a load bearing support for the stage 110 as well as a linear guide while the stage slides parallel to the pinion gear 140. To reverse the direction of the stage, the motor 126 causes the pinion wire 120 to rotate counter clockwise.

Figure 7:
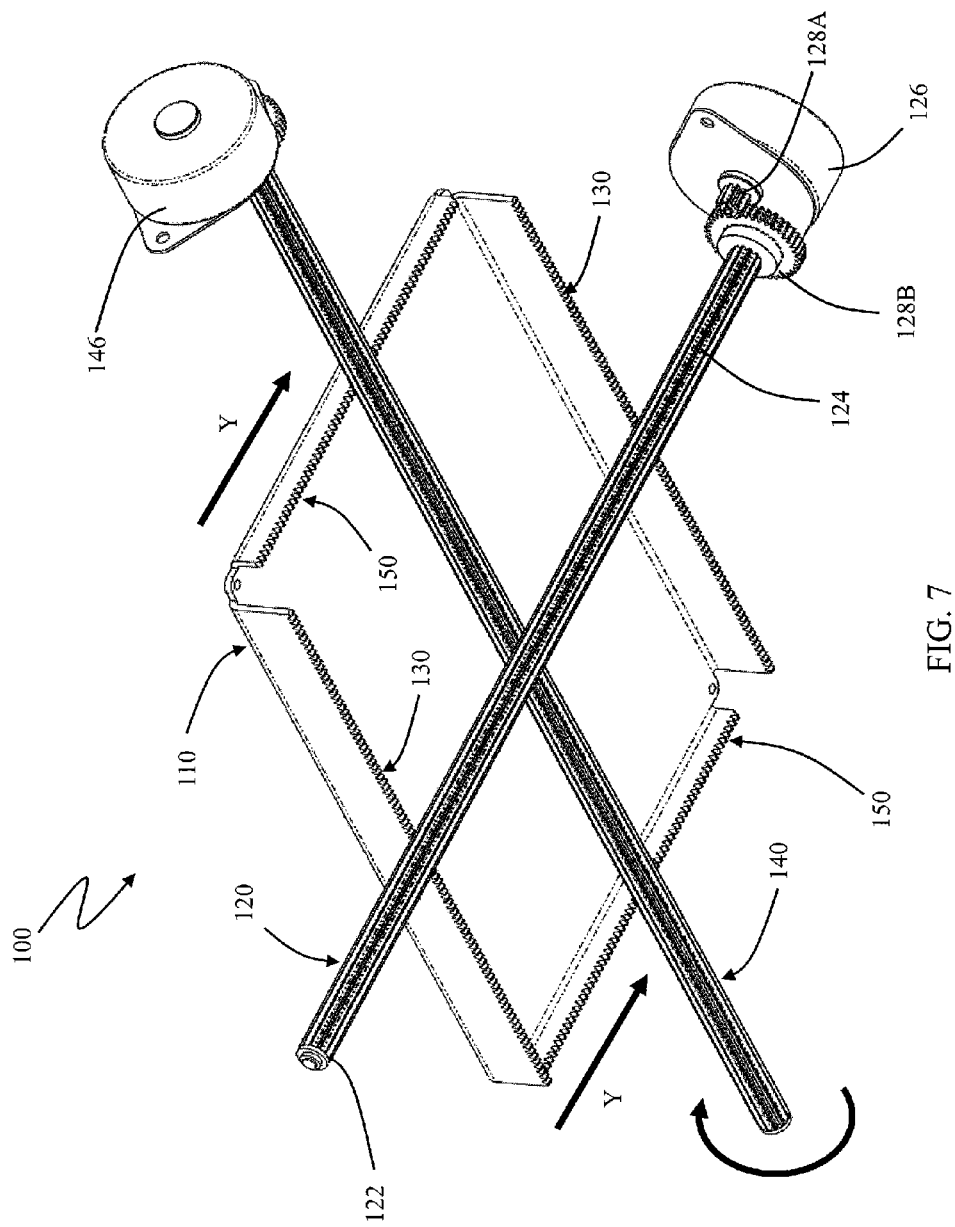
FIG. 7 is a bottom side perspective view of the platform and drive assemblies of the 2D positioning mechanism, in accordance with one embodiment of the present invention.

As shown in FIG. 7, the stage 110 is configured to move in the y-direction in response to rotation of the second pinion wire 140. When the pinion wire 140 is rotated clockwise, the stage is driven to the right toward the proximal end 124 of the first pinion wire 120. Similarly, counter clockwise rotation of the pinion wire 140 drives the stage to the left. In both cases, the gear rack 130 slides across the first pinion gear 120 which serves as a linear guide and load bearing support.

Figure 8:
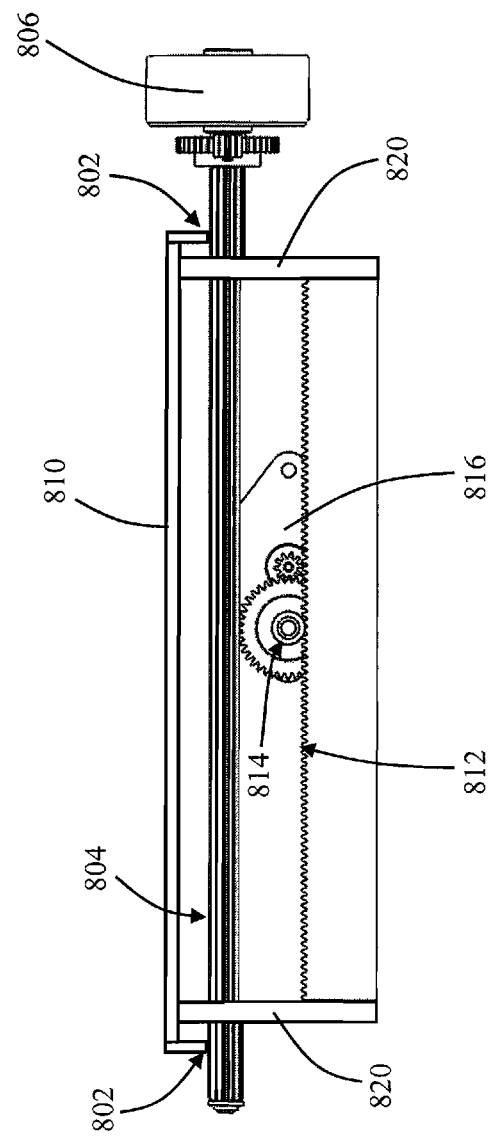
FIG. 8 is a front side view of the platform and drive assemblies of the 2D positioning mechanism, in accordance with a second embodiment of the present invention.
Figure 9:
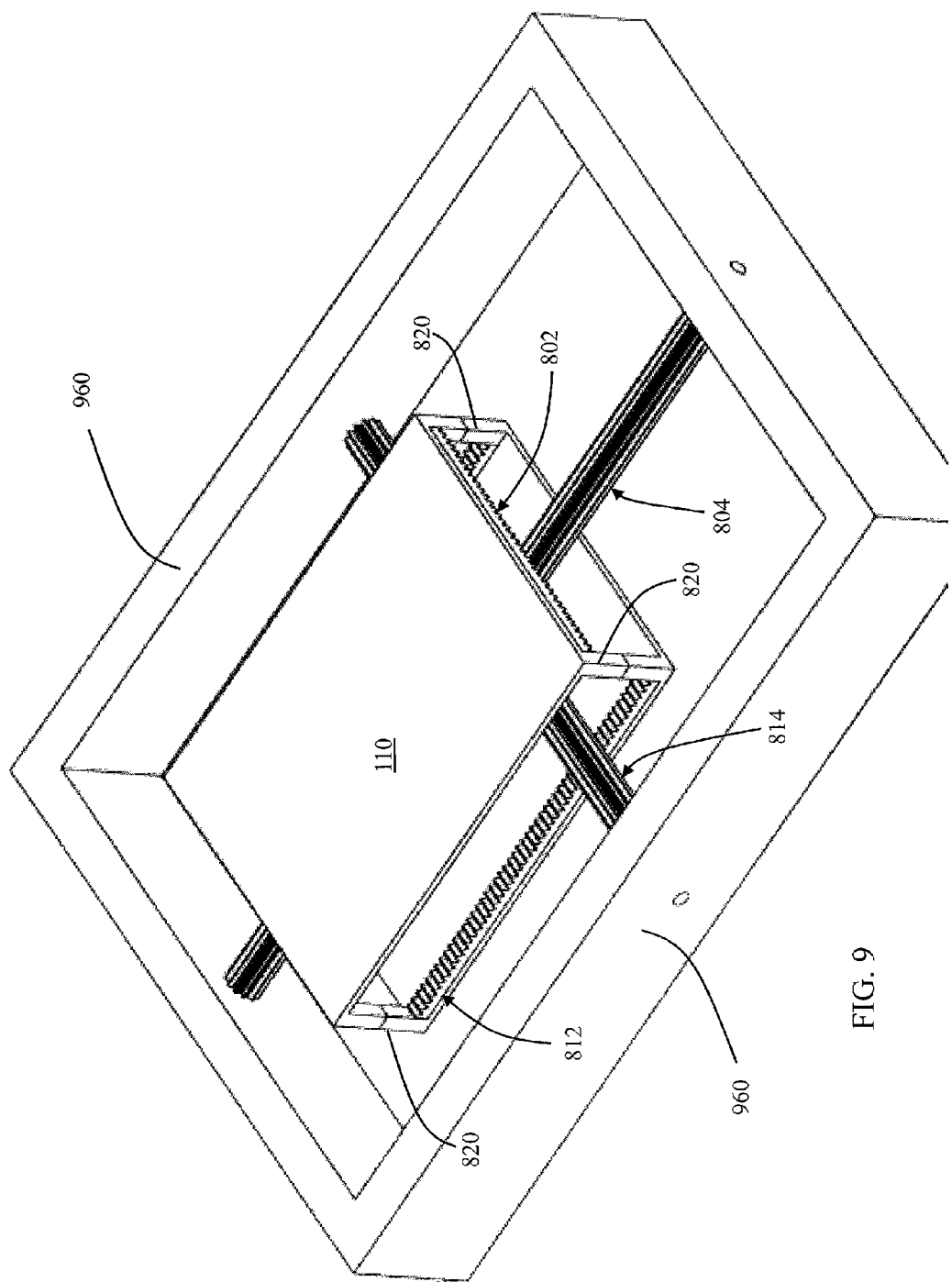
FIG. 9 is a perspective view of the 2D positioning mechanism, in accordance with the second embodiment of the present invention.

A second embodiment of the RPD positioning mechanism is shown in side view in FIG. 8 and perspective in FIG. 9. In this embodiment, two gear racks 802 associated with a first pinion wire 804 are physically above that pinion wire 804, while the other two gear racks 812 associated with second pinion wire 814 are physically below that pinion wire 814. The two pairs of gear racks 802, 812 are rigidly connected my means of a plurality of vertical supports 820 around the perimeter of the stage. The pinion wires are, therefore, effectively captured and secured between the racks with little or no play/backlash, thereby preventing the stage from lifting or the teeth from disengaging the pinion wires. The motors 806, 816 are configured to turn the pinion wires 804, 814, respectively, and shift the stage 810 in the same manner described above. FIG. 9 also illustrates a stationary frame 960 which is pivotably connected to the pinion wires 804, 814.

Figure 10:
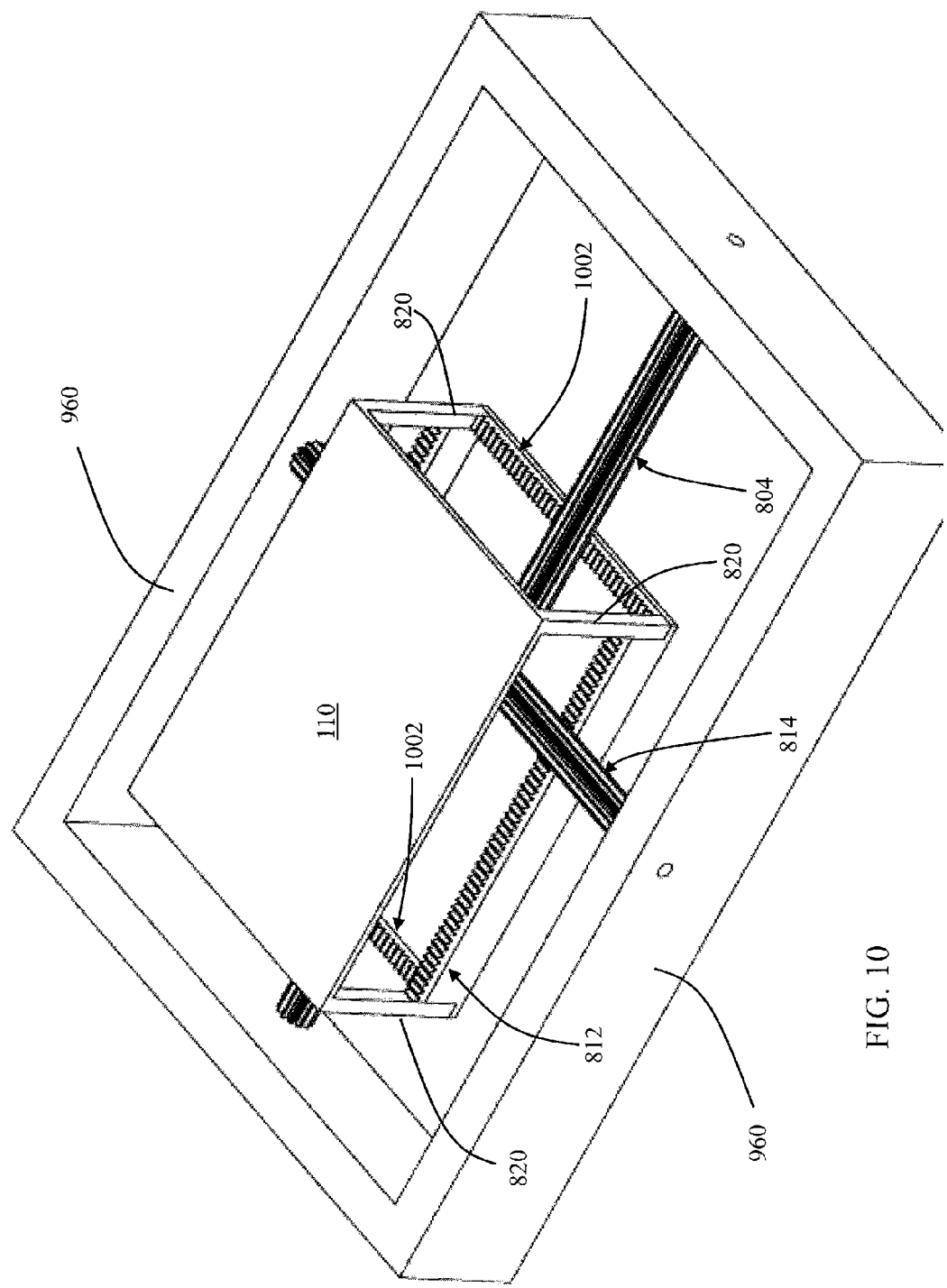
FIG. 10 is a perspective view of the 2D positioning mechanism, in accordance with a third embodiment of the present invention.

A third embodiment of the RPD positioning mechanism is shown in perspective view in FIG. 10. In this embodiment, the two gear racks 1002 associated with a first pinion wire 804 are physically below that pinion wire 804, and the other two gear racks 812 associated with and physically below the secondary pinion wire 814. The stage 110 is rigidly affixed above the two pairs of gear racks 1002, 812 by means of a plurality of vertical supports 820. The weight of the stage 110 and object thereon may be further supported by bearings or casters (not shown), for example, mounted under the gear racks 1002 and 812. This embodiment in particular suited for situations in which the object being moved is particular heavy since the weight is carried by the bearings and not the pinion wires alone. The stationary frame 1060 is pivotably connected to the pinion wires 804, 814.

Figure 11:
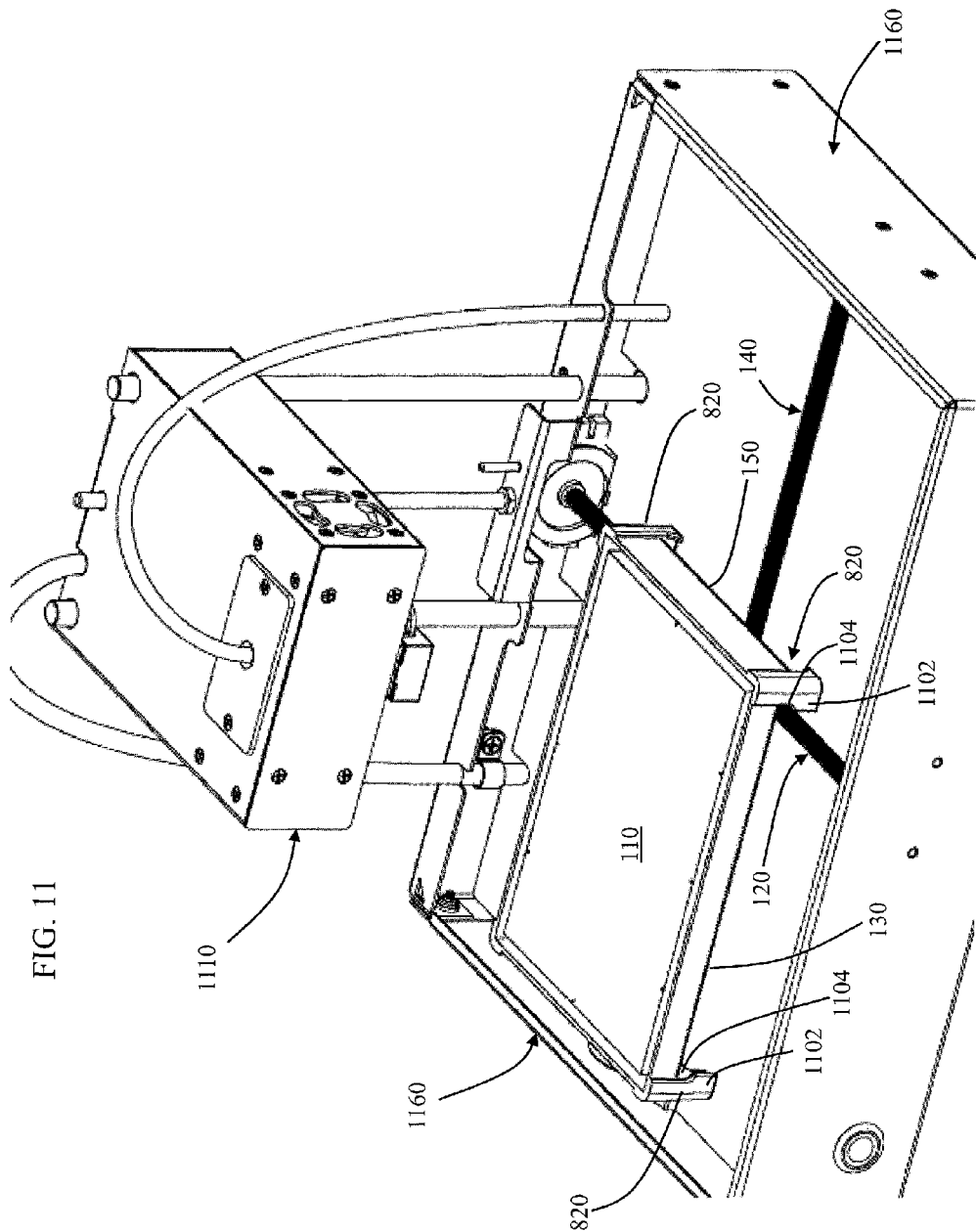
FIG. 11 is a perspective view of a 3D printer with the 2D positioning mechanism, in accordance with a fourth embodiment of the present invention.

Illustrated in FIG. 11 is a fourth embodiment of the RPD positioning mechanism complete with stage 110, pinion wires, 120, 140, thermoplastic extruder head 1110, and stationary frame 960. In this embodiment, the stage 110 includes a plurality of hooks that extend from the vertical supports 820. The hooks include a flange 1102 and recess 1104 large enough to receive a pinion wire. When stage 110 is driven to the end of its range, the pinion wire seats into the recess 1104. The flange, which extends at least partially under pinion wire when in the recess, prevents the pinion wire 120 from hopping or jumping away from the corresponding gear rack 130. Thus, the hook serves to capture the pinion wire to prevent vertical displacement of the stage 110 at either extreme of its travel.

In the embodiments above, the pinion wires are rods with teeth running uniformly down the length of the rod. In some other embodiments, the pinion wires have one or more helical teeth that wind around the rod, thus forming a helical gear. The angle of the helix angle of the gear teeth is preferably larger than 75 degrees but less than 90 degrees. The pinion wires may, but need not necessarily, be orthogonal to one another.

In the embodiments described above, the platform is a stage configured to move relative to a thermoplastic nozzle. In other embodiments, the stage is stationary and the first and second RPD positioning mechanism is configured to move the thermoplastic nozzle in 2D relative to the stage. Besides 3D printing, the positioning mechanism described herein may be configured, for example, as a 3D scanner, coordinate measurement machine, laser cutter or other cutting machine, 2-axis plotter, manufacturing assembly automation fixture, microtiter plate positioning machine, petri dish positioning machine, wafer positioning machine, LCD screen positioning machine, PCB positioning machine, and/or microscope positioning stage configured to retain a specimen for examination.

These and other stages may also be actuated using manual controls, a joystick, or one or more switches. The actuators and pinions may be coupled by any of numerous mechanical or electromechanical linkages including belts, rollers, direct connections, etc. The platform may further include bearings or rollers, for example, to carry the weight of the stage in addition to, or instead of, the pinion wires. In the alternative to a pair of gear racks for each axis, the platform may employ a single gear rack or a single wide gear rack. In another embodiment, the pinion wires for the two axes are configured to lie in the same plane with the x-axis pinion wire broken into two separate sections that are geared together around the break for the y-axis pinion wire. In this embodiment, the bottom of the stage may be a continuous surface of nubs formed by the superposition of a wide x-axis gear rack and a wide y-axis gear rack. In still another embodiment, the two pinion wires could also be arranged in a "T" configuration where the end of one run pinion wire is oriented toward the mid-section of the other pinion wire, thus avoiding the segmentation of one pinion wire and gear rack.

One or more embodiments of the present invention may be implemented with one or more computer readable media, wherein each medium may be configured to include thereon data or computer executable instructions for manipulating data. The computer executable instructions include data structures, objects, programs, routines, or other program modules that may be accessed by a processing system, such as one associated with a general-purpose computer or processor capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system. Examples of mass storage devices incorporating computer readable media include hard disk drives, magnetic disk drives, tape drives, optical disk drives, and solid state memory chips, for example. The term processor as used herein refers to a number of processing devices including personal computing devices, servers, general purpose computers, special purpose computers, application-specific integrated circuit (ASIC), and digital/analog circuits with discrete components, for example.

Although the description above contains many specifications, these should not be construed as limiting the scope of the invention but as merely providing illustrations of some of the presently preferred embodiments of this invention.

Therefore, the invention has been disclosed by way of example and not limitation, and reference should be made to the following claims to determine the scope of the present invention.

We claim:

1. A positioning machine comprising:
    a stationary frame;
    a moveable platform;
    a first drive assembly consisting of:
        a) a first rod in direct contact with the frame and platform; and
        b) a first actuator configured to rotate the first rod to move the platform in a first direction;
    a second drive assembly consisting of:
        a) a second rod in direct contact with the frame and platform; and
        b) a second actuator configured to rotate the second rod to move the platform a second direction; and
    wherein the first direction is substantially perpendicular to the second direction.

2. The positioning machine of claim 1, wherein the platform comprises:
    a rolling contact with the first rod in the first direction; and
    a sliding contact with the first rod in the second direction.

3. The positioning machine of claim 2, wherein the platform comprises:
    a rolling contact with the second rod in the second direction; and
    a sliding contact with the second rod in the first direction.

4. The positioning machine of claim 3, wherein the rolling contact between the platform and the first rod is a friction contact, and the rolling contact between the platform and the second rod is a friction contact.

5. The positioning machine of claim 3, wherein the rolling contact between the platform and the first rod is a geared contact, and the rolling contact between the platform and the second rod is a geared contact.

6. The positioning machine of claim 5, wherein the first rod comprises a first pinion wire and the second rod comprises a second pinion wire.

7. The positioning machine of claim 5, wherein the first rod comprises a helical gear and the second rod comprises a helical gear.

8. The positioning machine of claim 6, further comprising:
 a first gear rack configured to engage the first pinion wire; and
 a second gear rack configured to engage the second pinion wire.

9. The positioning machine of claim 8, wherein the first gear rack is positioned on top of the first pinion wire, and the second gear rack is positioned on top of the second pinion wire.

10. The positioning machine of claim 9, wherein the first gear rack is integral to the platform and the second gear rack is integral to the platform.

11. The positioning machine of claim 8, wherein the first gear rack is positioned on top of the first pinion wire, and the second pinion wire is positioned on top of the second gear rack.

12. The positioning machine of claim 8, wherein the first pinion wire is positioned on top of the first gear rack, and second pinion wire is positioned on top of the second gear rack.

13. The positioning machine of claim 8, wherein the first gear rack consists of a plurality of individual gear racks, each individual gear rack comprising a plurality of teeth; and wherein the second gear rack consists of a plurality of individual gear racks, each individual gear rack comprising a plurality of teeth.

14. The positioning machine of claim 6, wherein the first pinion wire comprises a plurality of teeth, each of the plurality of teeth extending the length of the first pinion wire; and wherein the second pinion wire comprises a plurality of teeth, each of the plurality of teeth extending the length of the second pinion wire.

15. The positioning machine of claim 14, wherein the first pinion wire and second pinion wire each comprise twelve teeth extending the length of the respective pinion wire.

16. The positioning machine of claim 1, wherein the first drive assembly and second drive assembly are configured to move the platform in a substantially horizontal plane.

17. The positioning machine of claim 1, wherein the first actuator comprises a motor and first speed-reducer transmission, and wherein the second actuator comprises a motor and a second speed-reducer transmission.

18. The positioning machine of claim 1, further comprising a processor configured to independently control the first actuator and second actuator; wherein the platform may be moved in any direction in a substantially horizontal plane.

19. The positioning machine of claim 1, wherein the moveable platform comprises a horizontal stage on which a three dimensional (3D) object is printed.

20. The positioning machine of claim 1, wherein the moveable platform comprises a nozzle from which 3D print material is extruded.

21. A positioning mechanism for moving an object in a plane without rotation, the positioning mechanism comprising:
 a stationary frame;
 a movable platform consisting of:
  a) a work surface;
  b) a first plurality of gear racks oriented in a first direction;
  c) a second plurality of gear racks oriented in a second direction, wherein the first direction is substantially non-parallel to the first direction;
 a first drive assembly consisting of:
  a) a first rod affixed to the stationary frame such that it is free to rotate about a longitudinal axis;
  b) one or more gear teeth extending along the length of the rod;
 a second drive assembly consisting of:
  a) a second rod affixed to the frame such that it is free to rotate about a longitudinal axis;
  b) one or more gear teeth extending along the length of the rod in a helical pattern;
 wherein the one or more gear teeth of the first drive assembly engage and maintain contact with the first plurality of gear racks of the movable platform such that:
  a) the first plurality of gear racks are driven in a direction substantially orthogonal to the gear teeth of the first drive assembly as the first rod rotates;
  b) the first plurality of gear racks are free to slide along the length of the gear teeth of the first drive assembly;
 wherein the gear teeth of the rod of the second drive assembly engage and maintain contact with the second plurality of gear racks of the movable platform such that:
  a) the second plurality of gear racks are driven in a direction orthogonal to the gear teeth of the second drive assembly as the second rod rotates;
  b) the second plurality of gear racks are free to slide along the length of the gear teeth of the second drive assembly.

22. The positioning machine of claim 19, wherein first rod and second rod are orthogonal.

23. The positioning machine of claim 20, wherein the one or more gear teeth extend along the length of the rod in a helical pattern.

24. The positioning machine of claim 21, wherein the helical pattern is characterized by a helix angle between 75 degrees and 90 degrees.

* * * * *